(12) United States Patent
Kato et al.

(10) Patent No.: US 6,939,607 B2
(45) Date of Patent: Sep. 6, 2005

(54) CUTTING TOOL

(75) Inventors: Hideki Kato, Aichi (JP); Yuki Hatano, Aichi (JP); Hideaki Yukimachi, Gifu (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/947,441

(22) Filed: Sep. 7, 2001

(65) Prior Publication Data
US 2002/0054794 A1 May 9, 2002

(30) Foreign Application Priority Data
Sep. 7, 2000 (JP) .......................................... 2000-272071

(51) Int. Cl.$^7$ ................................................. B32B 9/00
(52) U.S. Cl. ........................ 428/336; 407/119; 51/307; 51/309; 428/325; 428/697; 428/698; 428/699
(58) Field of Search ............................ 407/119; 51/307, 51/309; 428/336, 325, 697, 698, 699, 701

(56) References Cited

U.S. PATENT DOCUMENTS

| | | | |
|---|---|---|---|
| 3,616,506 A | | 11/1971 | Ekemar |
| 5,188,908 A | * | 2/1993 | Nishiyama et al. |
| 5,915,162 A | * | 6/1999 | Uchino et al. ............... 428/551 |

FOREIGN PATENT DOCUMENTS

| | | | |
|---|---|---|---|
| EP | 0 653 499 A1 | | 5/1995 |
| JP | 60-127905 | * | 7/1985 |
| JP | 62-099467 | * | 5/1987 |
| JP | 4-289002 | | 10/1992 |
| JP | 05-016031 | * | 1/1993 |
| JP | 5-069205 | | 3/1993 |
| JP | 7-136810 | | 5/1995 |
| JP | 11-197936 | * | 7/1999 |
| JP | 11-254208 | * | 9/1999 |

OTHER PUBLICATIONS

European Search Report for EP 01 12 0751 dated Jan. 14, 2002.

* cited by examiner

*Primary Examiner*—Archene Turner
(74) *Attorney, Agent, or Firm*—Sughrue Mion, PLLC

(57) ABSTRACT

A ceramic cutting tool including a ceramic base member 4 of a tool main body 1 which is formed of a composite ceramic which contains a hard phase dispersed within an alumina matrix phase. The hard phase contains, as a predominant component, one or more elements selected from hard-phase-forming metal elements M in the form of at least one of a carbide, nitride, or boride, or in the form of a solid solution of at least two selected from the carbide, nitride and boride. The hard-phase-forming metal elements M include Ti, Zr, Hf, V, Nb, Ta, Cr, Mo, W and Si. The surface of the ceramic base member 4 is covered with a coating layer 1$f$, which contains titanium carbonitride or titanium nitride as a predominant component. The coating layer 1$f$ has an average crystal-grain size of 0.1 to 0.5 μm as observed on the surface, and an average thickness of 0.5 to 2 μm. The coating layer 4$f$ is formed by a CVD at a low to medium temperature range of 750 to 900° C. The ceramic cutting tool can be fabricated at low cost and can secure stable cutting performance over a long period even when the tool is used under severe cutting conditions under which large thermal and mechanical loads act on the tool.

9 Claims, 8 Drawing Sheets

COATING LAYER

CERAMIC BASE MEMBER

1 μm $$d = \frac{dmax + dmin}{2}$$

1 μm

COATING LAYER

CERAMIC BASE MEMBER

1 μm

1 μm

COATING LAYER

CERAMIC BASE MEMBER

1 μm

CUTTING TOOL

BACKGROUND OF THE INVENTION

1. Field of the Invention

The present invention relates to a cutting tool having a tool main body formed of ceramic which can be used as a throw-away tip, an end mill, a drill, or the like, and more particularly, to a cutting tool in which a surface coating is provided on the tool main body formed of ceramic to improve wear resistance.

2. Description of the Related Art

Conventionally, hard materials, such as carburized and quenched steel, die steel and tool steel, have been ground by use of a grinding stone. However, grinding involves a problem of low machining efficiency. Therefore, in order to perform machining at higher speeds, attempts have been made to replace grinding with cutting using a cBN (cubic Boron Nitride) tool or a ceramic tool formed of an alumina-titanium carbide composite ceramic. Recently, cBN tools have often been used, because a ceramic tool formed of alumina-titanium carbide composite ceramic has a short service life and poor reliability, and cannot withstand a further increase in cutting speed.

Although cBN tools provide excellent cutting performance, they are very expensive, because cBN tools are fabricated by utilizing a super-high pressure technique as in the case of artificial diamond, thereby hindering the popularization of cBN tools. In view of the foregoing, various ceramic tools have been proposed which are less expensive and provide performance comparable to that of cBN tools in high speed cutting. For example, Japanese Patent Application Laid-Open (kokai) Nos. 4-289002, 5-69205, and 7-136810 disclose techniques for improving wear resistance and fracture resistance of a ceramic tool by forming a coating layer of titanium carbide or titanium nitride on the surface of the ceramic base member by CVD (Chemical Vapor Deposition).

However, in the techniques disclosed in the above patent publications, since inadequate consideration is given to residual stress produced in the coating film at the time of its formation, great improvement in performance cannot be expected. That is, in CVD, a coating-layer forming substance is deposited on the surface of a ceramic base member, while being synthesized through chemical reaction of a gaseous source material. This reaction is typically performed at a high temperature of 1000° C. or more in order to activate the source material. When the difference in coefficient of thermal expansion between a ceramic base member and a coating layer formed thereon is large, a large residual stress is produced in the coating layer when the formed layer is cooled to room temperature. Moreover, when the coating layer is composed of a plurality of sub-layers of different materials having different coefficients of thermal expansion, the differences in coefficient of thermal expansion among the sub-layers cause generation of residual stress. Although ceramic tools have excellent wear resistance as compared with tools formed of high-speed tool steel or cemented carbide alloy, they have insufficient fracture resistance, and particularly insufficient resistance to flaking fracture (flaking of a cutting edge to a shell-like shape) which occurs during machining of the above-mentioned hard materials to shorten the service life thereof. Therefore, even when the above-mentioned coating layer is provided, satisfactory performance in terms of fracture resistance cannot be expected if a large residual stress is produced in the coating layer.

Moreover, the problem of residual stress arises not only during formation of a coating layer but also during actual machining. Since a tool is heated to high temperature due to contact friction between the tool and a workpiece during actual machining, when the tool is used repeatedly, thermal shock repeatedly acts on the tool due to the repeated cycles of heating and cooling. In a typical case in which a coating layer of titanium nitride is formed on the surface of the above-described composite ceramic base member, the coating layer has a coefficient of thermal expansion higher than that of the base member. As a result, tensile residual stress is produced in the coating layer during cooling which is performed after forming the layer by CVD, which tensile residual stress also lowers the fracture resistance of the tool. In particular, since the inclination toward labor saving and high-efficient machining has become stronger in recent years, tools which can be used in cutting conditions under which large thermal and mechanical loads act on tools have been developed. However, the above-described problem has been an obstacle in such development.

SUMMARY OF THE INVENTION

It is therefore an object of the present invention to provide a ceramic cutting tool which can be fabricated at low cost and which can secure stable cutting performance over a long period even when the tool is used under severe cutting conditions, for example, when the tool is used for cutting a hard material, under which large thermal and mechanical loads act on the tool.

To achieve the above object, the present invention provides a cutting tool having a tool main body characterized in that the tool main body comprises a ceramic base member (also referred to as the ceramic interior portion) formed of a composite ceramic which contains a hard phase dispersed within a matrix ceramic phase containing alumina as a predominant component (hereinafter also referred to as "alumina matrix phase"); and a coating layer covering the surface of the ceramic base member and containing titanium carbonitride or titanium nitride as a predominant component, wherein the coating layer has an average crystal-grain size of 0.1 to 0.5 $\mu$m as observed on the surface, and an average thickness of 0.5 to 2 $\mu$m. The hard phase contains, as a predominant component, one or more elements selected from hard-phase-forming metal elements M in the form of at least one of a carbide, nitride, or boride, or in the form of a solid solution of at least two selected from the carbide, nitride and boride. The hard-phase-forming metal elements M preferably include Ti (titanium), Zr (zirconium), Hf (hafnium), V (vanadium), Nb (niobium), Ta (tantalum), Cr (chromium), Mo (molybdenum), W (tungsten) and Si (silicon).

The main point in development of a ceramic cutting tool having a coating layer according to the present invention was to find a way to suppress reduction in fracture resistance while maintaining the strength of bonding between the coating layer and the ceramic base member. In view of this, the present inventors carried out various studies and determined that fracture resistance can be improved advantageously by employing, as the ceramic base member, a composite ceramic which contains a hard phase dispersed within an alumina matrix phase and by employing, as a material for the coating layer, a material which contains titanium carbonitride or titanium nitride as a predominant component. Moreover, through particular studies, the present inventors determined that when the average size of crystal grains constituting the formed coating layer is adjusted to 0.1 to 0.5 $\mu$m and the average thickness of the coating layer is adjusted to 0.5 to 2 µm, residual stress within the coating layer can be reduced to thereby realize further excellent fracture resistance.

In the case of a coating layer containing titanium carbonitride or titanium nitride as a predominant component, when the average size of constituent crystal grains is reduced to 0.5 µm or less, generation of residual stress within the coating layer is suppressed, so that the fracture resistance of a tool can be greatly improved. The studies performed by the present inventors have revealed that the size of crystal grains in the coating layer varies depending on the formation temperature of the coating layer, and, with a decrease in the formation temperature, growth of crystal grains tends to be suppressed, resulting in decreased average size. The residual-stress-suppressing effect which greatly improves the fracture resistance of a tool becomes considerable when the forming temperature of the coating layer is restricted so that the average size becomes 0.5 µm or less. Thus, in spite of use of the above-described inexpensive composite ceramic, the above-described flaking fracture and other problems can be effectively suppressed to thereby realize fracture resistance comparable to or close to that of cBN tools.

In the present specification, the term "predominant component" refers to a component which accounts for the highest content by mass in the entire substance in question. Accordingly, other minor components may be contained in the substance, insofar as the object of the present invention is achieved and the minor components do not impede the effect of the present invention. The size of a crystal grain is defined in the following manner. As shown in FIG. 5, various parallel lines circumscribe a crystal grain which is observed on the microstructure of a polished cut surface. The size of the crystal grain is represented by an average value of the minimum distance dmin between such parallel lines and the maximum distance dmax between such parallel lines (i.e., size d=(dmin+dmax)/2).

When the average size of crystal grains of the coating layer exceeds 0.5 µm, the residual-stress-suppressing effect becomes insufficient, and thus fracture resistance cannot be improved. When the average size of crystal grains of the coating layer is less than 0.1 µm, this indicates that the formation temperature of the coating layer was very low. In such a case, the coating layer becomes inhomogeneous, and the coating layer easily exfoliates during use of the tool, because of lowered strength of bonding between the coating layer and the ceramic base member. More preferably, the average size of crystal grains of the coating layer is set to 0.1 to 0.3 µm.

The level of residual stress of the coating layer is affected by the thickness of the coating layer. In the present invention, the residual stress can be effectively suppressed by controlling the average thickness of the coating layer to 0.5 to 2 µm to thereby improve the fracture resistance of the tool. When the average thickness of the coating layer is less than 0.5 µm, the wear resistance becomes insufficient. When the average thickness of the coating layer exceeds 2 µm, the level of the residual stress increases, thus impairing the fracture resistance.

The coating layer is preferably formed through CVD performed in a low to medium temperature within the range of 750 to 900° C. When the forming temperature of the coating layer (reaction temperature) is 900° C. or higher, an excessively large residual stress is produced in the coating layer, resulting in failure to secure sufficiently high fracture resistance of the tool. By contrast, when the forming temperature of the coating layer is lower than 750° C., a chemical reaction for producing a material for the coating layer fails to proceed sufficiently, and thus, the coating layer becomes inhomogeneous. More preferably, the forming temperature of the coating layer is set to 830 to 880° C.

In CVD film formation, a ceramic base member having a desired shape is placed in a reaction chamber, the ceramic base member is heated to the above-described reaction temperature, and a source gas is fed to the reaction chamber together with a carrier gas (e.g., hydrogen gas ($H_2$)). A coating-layer-forming material is thereby produced due to a chemical reaction of the source gas and is deposited on the surface of the ceramic base body. When a coating layer of titanium nitride is formed, a gas containing a titanium-source component (e.g., titanium chloride such as titanium tetrachloride ($TiCl_4$)) and a nitride-source component (e.g., nitrogen gas ($N_2$) or ammonia ($NH_3$)) can be used as the source gas. When a coating layer of titanium carbonitride is formed, a mixture of the above-described source gas for forming a titanium nitride coating layer and a carbon-source component (e.g., hydrocarbon such as methane or a gas of any other organic compound) can be used as a source gas. Moreover, an organic compound containing nitrogen can be used as a source gas for forming a coating layer of titanium carbonitride. Titanium carbonitride is a solid solution of titanium carbide (general formula: TiC) and titanium nitride (general formula: TiN), and its general formula is represented by $TiC_{1-x}N_x$. The value of x can be changed in accordance with the compositional proportions of the nitride-source component and the carbon-source component in the source gas. Notably, when the compositional proportions of the nitride-source component and the carbon-source component are changed continuously or stepwise during a film forming process, a coating layer can be formed in such manner that the value of x changes continuously or stepwise in the thickness direction. When the value of x is low (i.e., the titanium carbide content is high), the wear resistance of the coating layer is improved. However, in some cases, a high value of x (i.e., the titanium nitride content is high) is advantageous from the viewpoint of improved bonding strength, depending on the material of the ceramic base member. In such a case, a film forming process is carried out while the ratio of the carbon-source component to the nitride-source component is increased gradually. As a result, a composition-graded coating layer can be formed in such manner that the value of x is relatively high on the side of the ceramic base member and is relatively low on the side of the layer surface.

Titanium nitride is preferably used as a material of the coating layer, from the viewpoint of increasing the strength of bonding with the ceramic base member and further increasing the fracture resistance of the tool. When titanium carbonitride is used, the above-mentioned x is desirably set to as high a value as possible (e.g., $0.6 \leq x \leq 1$). This is because titanium nitride provides higher toughness as compared with titanium carbide or titanium carbonitride, and therefore can relax residual stress effectively. When titanium nitride is used as a material of the coating layer, the coating layer preferably has an average thickness of 0.5 to 1 µm.

The hard phase is a major constituent phase which determines the wear resistance of the composite ceramic, which constitutes the ceramic base member, and contains, as a predominant component, one or more elements selected from hard-phase-forming metal elements M, including Ti, Zr, Hf, V, Nb, Ta, Cr, Mo, W and Si. The hard phase contains the selected hard-phase-forming metal element(s) M in the form of at least one of a carbide, nitride, or boride, or in the form of a solid solution of at least two selected from a carbide, nitride and boride of the hard-phase-forming metal elements M. Titanium carbide, titanium carbonitride, tantalum carbide, tungsten carbide, silicon carbide, chromium carbide and molybdenum carbide are preferably used in the present invention, because of their high hardness and excellent effects of imparting wear resistance. Notably, when Zr is used, a minute amount of Hf may naturally be mixed into the hard phase as an unavoidable impurity. Moreover, in addition to containing the above-mentioned metal components, the hard phase may contain other metal components (e.g., an unavoidable metal impurity in an amount not greater than 1% by mass) within a range in which the desired wear resistance of the hard phase is maintained.

The hard phase content of the composite ceramic is preferably 5 to 40% by volume. When the hard phase content is less than 5% by volume, the hardness of the ceramic base member is insufficient, and the wear resistance of the flank of the tool becomes insufficient, with resultant failure to provide the desired performance. When the hard phase content exceeds 40% by volume, the chemical stability of the composite ceramic is impaired, and the wear resistance of the cutting face of the tool becomes insufficient. More preferably, the hard phase content of the composite ceramic is 15 to 35% by volume. In the present specification, the hard phase content by volume is estimated on the basis of the area ratio of the hard phase as observed on a polished cut surface of the composite ceramic.

Crystal grains of the hard phase preferably have an average size of 0.3 to 1 $\mu$m. When the average size of crystal grains of the hard phase exceeds 1 $\mu$m, the strength of the ceramic base member is insufficient, with possible failure to secure sufficient resistance to flaking fracture. Meanwhile, decreasing the average size of crystal grains to 0.3 $\mu$m or less is not preferred, because such a small average size increases the preparation cost of the material powder. More preferably, the average size of hard-phase crystal grains is set to 0.4 to 0.7 $\mu$m.

Figure 1:
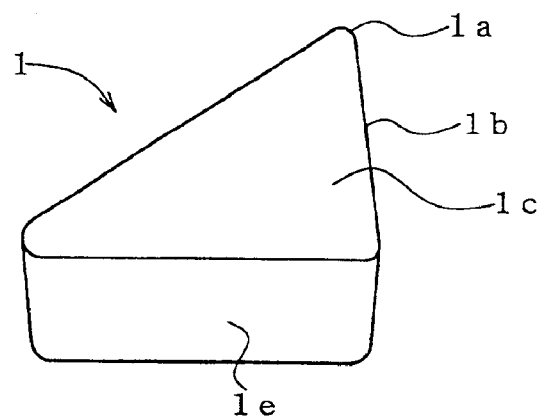
FIGS. 1($a$) to 1($e$) provide a perspective view, schematic cross sections of a side face portion, and enlarged partial perspective view of a throw-away tip, which embody the ceramic cutting tool of the present invention (including several modifications)
Figure 1:
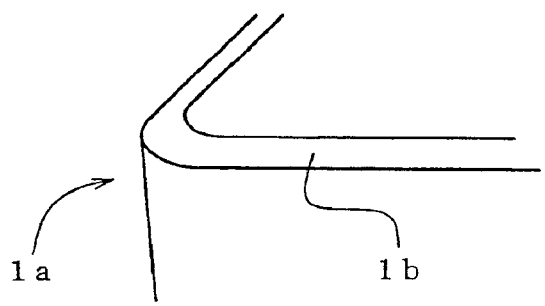
Figure 1:
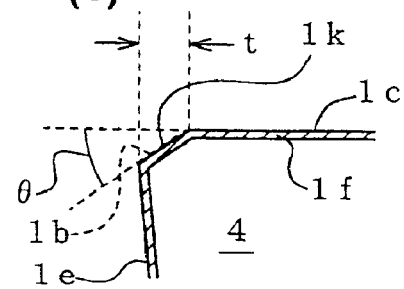
Figure 1:
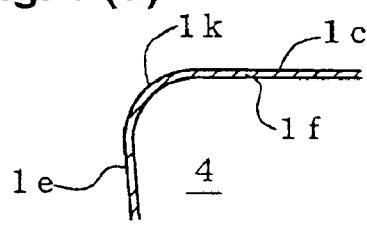
Figure 1:
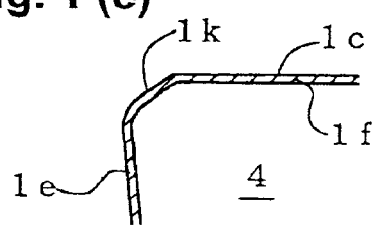

Reference numerals are used to identify items shown in the drawings as follows:
1: throw-away tip (tool main body)
1$c$: cutting face
1$e$: flank
1$f$: coating layer
4: ceramic base member
11: tip holder

DESCRIPTION OF THE PREFERRED EMBODIMENTS

FIG. 1 depicts one embodiment of the ceramic cutting tool of the present invention and shows a throw-away tip (hereinafter simply referred to as a "tip") 1, serving as a tool main body of the cutting tool. As shown FIG. 1($a$), the tip 1 has a structure such that the entire outer surface of a ceramic base member 4 formed in the form of a flat, substantially rectangular prism is covered with a coating layer 1$f$ shown in FIG. 1($c$). A main face 1$c$ of the tip 1 forms a cutting face (hereinafter also referred to as a "cutting face 1$c$"), and each side face 1$e$ forms a flank (hereinafter also referred to as a "flank 1$e$" as well). Each corner 1$a$ of the tip 1 is rounded as shown in FIG. 1($b$), and a chamfer 1$k$ is formed for a corresponding cutting edge 1$b$ as shown in FIG. 1($c$). The chamfer 1$k$ provides a flat surface as viewed along its cross section and is adjusted such that the angle $\theta$ formed between the chamfer 1$k$ and the main face 1$c$ serving as a cutting face falls within a range of 20 to 35°. Notably, as shown in FIG. 1($d$), the chamfer 1$k$ may be formed to have an outwardly curved surface (rounded surface) as viewed along its cross section. Alternatively, as shown in FIG. 1($e$), the chamfer 1$k$ may be formed to have flat and curved surfaces in combination as viewed along its cross section.

The ceramic base member 4 is formed of the above-described compound ceramic including hard-phase crystal grains dispersed within the alumina matrix phase. The content of the hard-phase crystal grains in the compound ceramic is 5 to 40% by volume, and the average size of the hard-phase crystal grains as observed on the microstructure of a cut surface is 0.3 to 1 $\mu$m. The coating layer 1$f$ contains titanium nitride or titanium carbonitride as a predominant component. The average size of crystal grains observed at the surface of the coating layer is 0.1 to 0.5 $\mu$m, and the average thickness of the coating layer is 0.5 to 2 $\mu$m.

Next, an example method for fabricating the above-described tip 1 will be described.

Alumina powder, hard phase powder and sintering aid powder are mixed in predetermined respective amounts, and if necessary, a binder is added to the mixture, which is then mixed. A green body is formed from the resultant mixture by means of a known molding method, such as press molding (including cold isostatic molding), and is then fired to obtain a ceramic base member 4. Subsequently, the ceramic base member 4 is placed in a reaction chamber and heated to a low to medium temperature of 750 to 900° C. by means of a heater disposed within the reaction chamber. In an example case in which a coating layer of titanium nitride is formed, in the thus-established state, titanium tetrachloride and nitrogen serving as source gases are fed to the reaction chamber together with hydrogen serving as a carrier gas. Through decomposition and reaction of the source gases, titanium nitride is synthesized and deposited on the surface of the ceramic base member 4 to thereby grow or form a coating layer 1$f$. Notably, the crystal-grain size of the coating layer $1f$ is adjusted to the above-described range by controlling the reaction temperature to the above-described range; and the thickness of the coating layer $1f$ is adjusted to the above-described range by controlling the length of the growth period.

Figure 2:
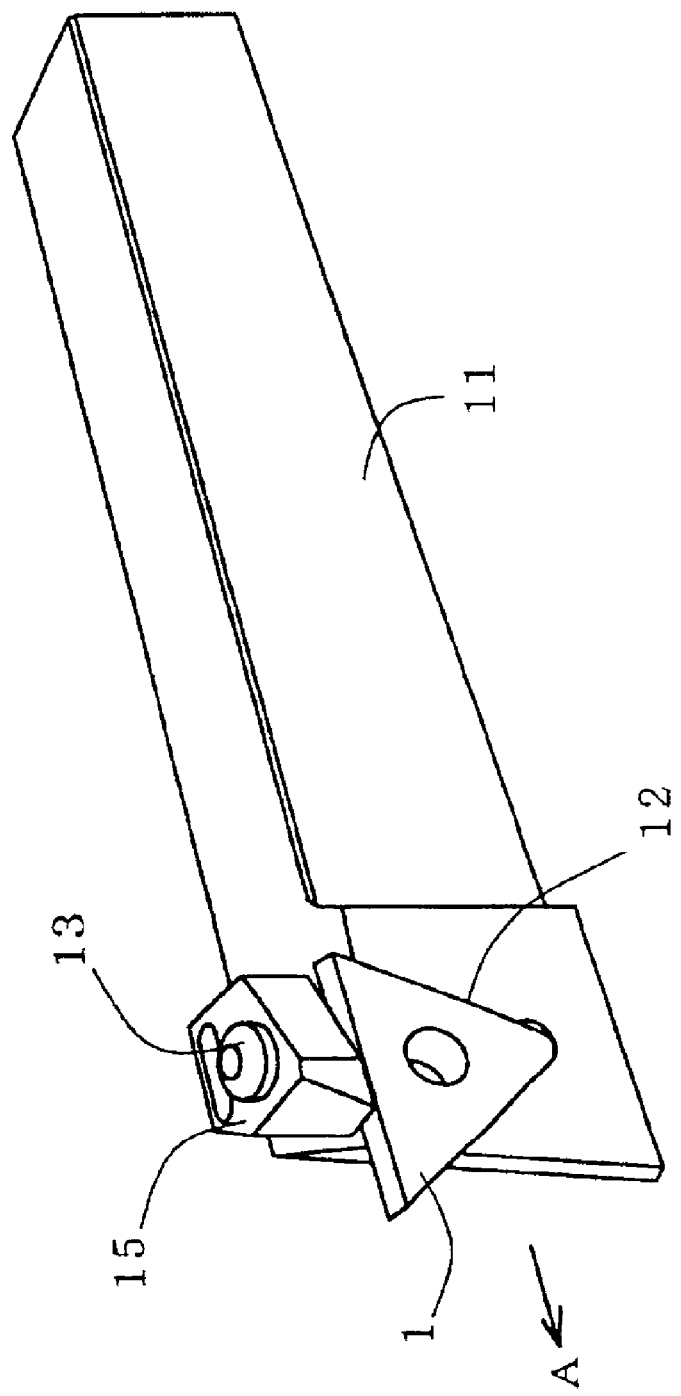
FIG. 2 is a perspective view showing a state in which the throw-away tip of FIG. 1 is attached to a tip holder.

As shown in FIG. 2, the above-described tip 1 is detachably attached to a tip holder 11 for use thereof. Specifically, the tip 1 is fitted into a concave attachment portion 12 provided at the tip of the tip holder 11 such that the outer circumferential surface of the tip 1 is supported by the concave attachment portion 12. Subsequently, an engagement member 15 is brought into contact with a side face of the tip 1 facing upward, and is fixed by bolt 13. Thus, the tip 1 is fixed to the tip holder 11.

Figure 3:
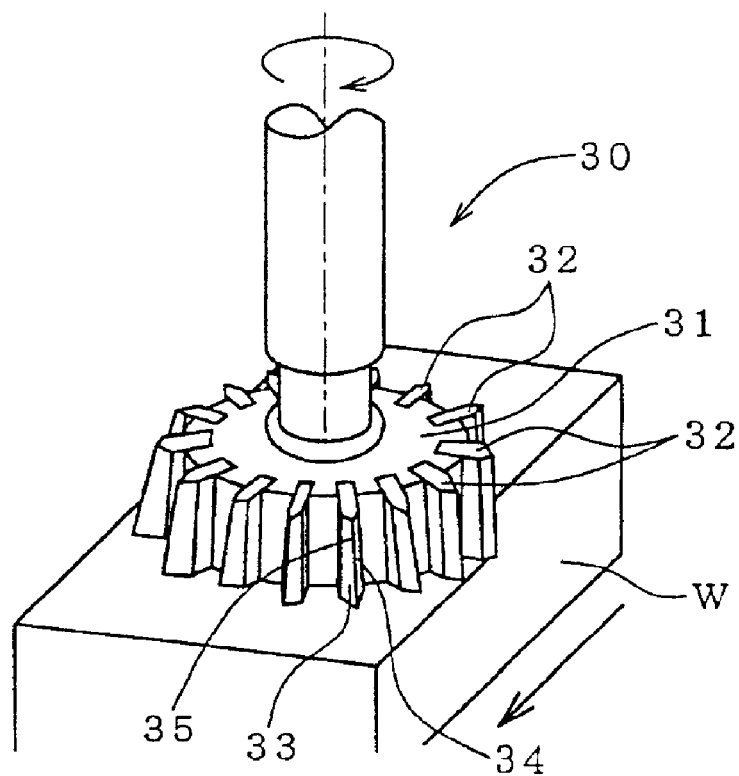
FIGS. 3($a$) and 3($b$) are a perspective view and enlarged partial side view, respectively, showing an example in which the ceramic cutting tool of the present invention is constructed in the form of a milling cutter.
Figure 3:
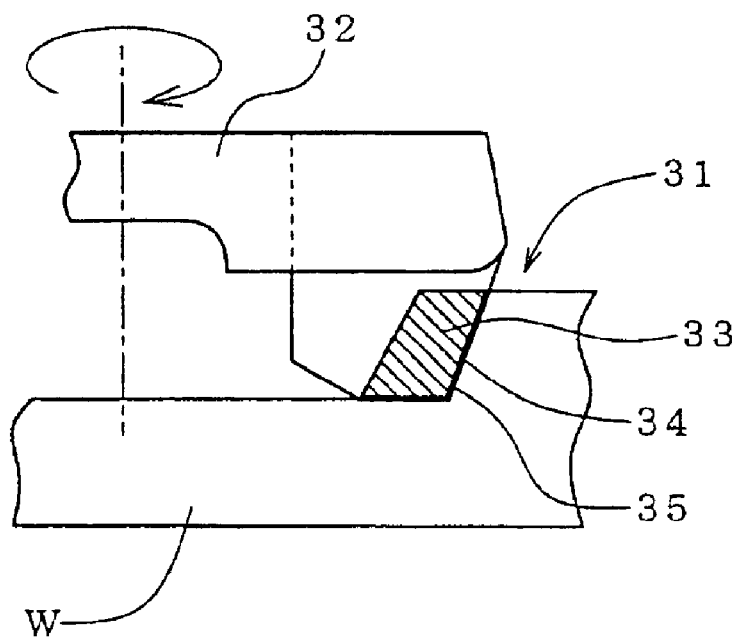
Figure 4:
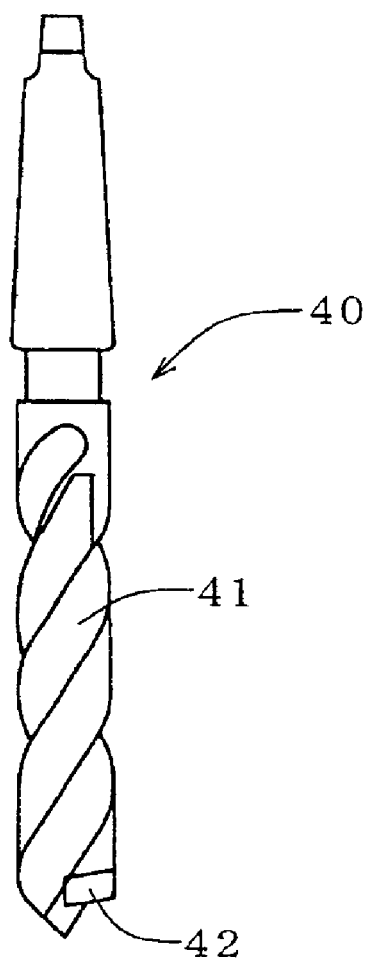
FIG. 4 is a front view and bottom view showing an example in which the ceramic cutting tool of the present invention is constructed in the form of a drill.
Figure 4:
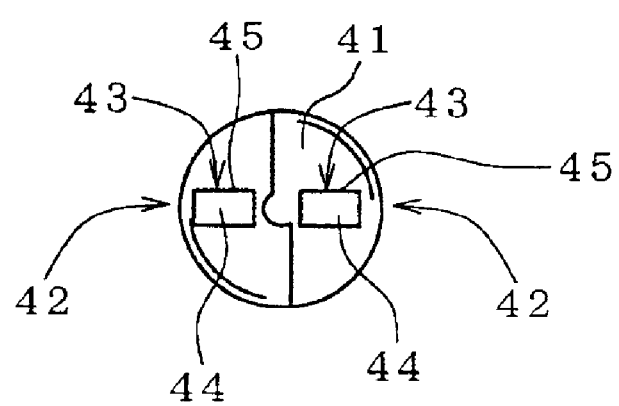

Needless to say, the ceramic cutting tool of the present invention can be applied to other types of cutting tools such as milling cutters and drills. FIG. 3(a) shows a face milling cutter 30, one example of the other types of cutting tools. A plurality of cutting tips 32 are embedded in the outer circumferential surface of a rotary base 31. Reference letter W denotes a workpiece to be machined. Each of the cutting tips 32 is formed of a material similar to that of the above-described tip 1, and a coating layer similar to that of the above-described tip 1 is formed on a cutting face 33 and a flank 34 adjacent to a cutting edge 35 as shown in FIG. 3(b). FIG. 4 shows a drill 40, which is another example of the other types of cutting tools. Two drill tips 42 are attached to the tip end surface of a shaft-shaped main body 41. Each of the drill tips 42 is formed of a material similar to that of the above-described tip 1, and a coating layer similar to that of the above-described tip 1 is formed on a cutting face 43 and a flank 44 adjacent to a cutting edge 45.

Next, the present invention is illustrated by reference to the following Example. However, the present invention should not be construed as being limited thereto.

First, alumina powder (average grain size: 0.5 μm) was prepared as a material powder (starting material); titanium carbide powder, titanium carbonitride powder (composition: $TiC_{0.5}N_{0.5}$), tantalum carbide powder, and tungsten carbide powder (each having average grain size of 1.0 μm) were prepared as hard phase powders; and yttrium oxide powder and dysprosium oxide powder (each having an average grain size of 0.9 μm) were prepared as sintering aid powders.

These powders were mixed to attain each of various compositions shown in Table 1, and the resultant mixture, together with an organic solvent, was wet-mixed and pulverized for 24 hours with an attriter mill to thereby obtain a material slurry. After drying the material slurry, paraffin serving as a binder was added thereto, and the resultant material was subjected to die press molding performed under a pressure of 1 ton/cm² to thereby obtain a green body or compact. After a debindering process, the green body was fired under a set of firing conditions (temperature and time) selected from various sets of firing conditions shown in Table 1 in an argon atmosphere. After firing, if necessary, the fired body was subjected to hot isostatic pressing (HIP) at 1500° C. and 1.5 GPa (Table 1 shows whether or not the HIP was performed). The thus-obtained fired body was ground into the shape shown in FIG. 1 (however, the corner $1a$ was not rounded) to thereby obtain a ceramic base member 4. The ceramic base member 4 had dimensions prescribed in ISO standard 1832/AM1 as TNGN 160412 (specifying the size and shape of a cutting tool).

TABLE 1

| Sample No. | Composition | | | | | | Firing conditions ° C.-Hrs. | HIP |
|---|---|---|---|---|---|---|---|---|
| | $Al_2O_3$ Wt % | TiC Wt % | TiCN wt % | TaC wt % | WC wt % | Sintering aid wt % | | |
| 1 | Balance | 0 | 0 | 0 | 0 | 0.5MgO-1$Y_2O_3$ | 1500-4 | Not performed |
| 2 | Balance | 5 | 0 | 0 | 0 | 0.5MgO-1$Y_2O_3$ | 1600-4 | Not performed |
| 3 | Balance | 10 | 0 | 0 | 0 | 0.5MgO-1$Y_2O_3$ | 1650-4 | Not performed |
| 4 | Balance | 20 | 0 | 0 | 0 | 0.5MgO-1$Y_2O_3$ | 1650-4 | Performed |
| 5 | Balance | 30 | 0 | 0 | 0 | 0.5MgO-1$Y_2O_3$ | 1700-4 | Performed |
| 6 | Balance | 40 | 0 | 0 | 0 | 0.5MgO-1$Y_2O_3$ | 1800-4 | Performed |
| 7 | Balance | 45 | 0 | 0 | 0 | 0.5MgO-1$Y_2O_3$ | 1850-4 | Performed |
| 8 | Balance | 0 | 30 | 0 | 0 | 0.5MgO-1$Dy_2O_3$ | 1650-4 | Performed |
| 9 | Balance | 20 | 10 | 0 | 0 | 0.5MgO-1$Dy_2O_3$ | 1700-4 | Performed |
| 10 | Balance | 20 | 0 | 10 | 0 | 0.5MgO-1$Dy_2O_3$ | 1700-4 | Performed |
| 11 | Balance | 20 | 0 | 0 | 10 | 0.5MgO-1$Dy_2O_3$ | 1700-4 | Performed |
| 12 | Balance | 0 | 20 | 10 | 0 | 0.5MgO-1$Dy_2O_3$ | 1650-4 | Performed |
| 13 | Balance | 10 | 20 | 0 | 0 | 0.5MgO-1$Dy_2O_3$ | 1650-4 | Performed |
| 14 | Balance | 30 | 0 | 0 | 0 | 0.5MgO-1$Y_2O_3$ | 1850-4 | Performed |
| 15 | Balance | 20 | 0 | 10 | 0 | 0.5MgO-1$Dy_2O_3$ | 1850-4 | Performed |

Figure 5:
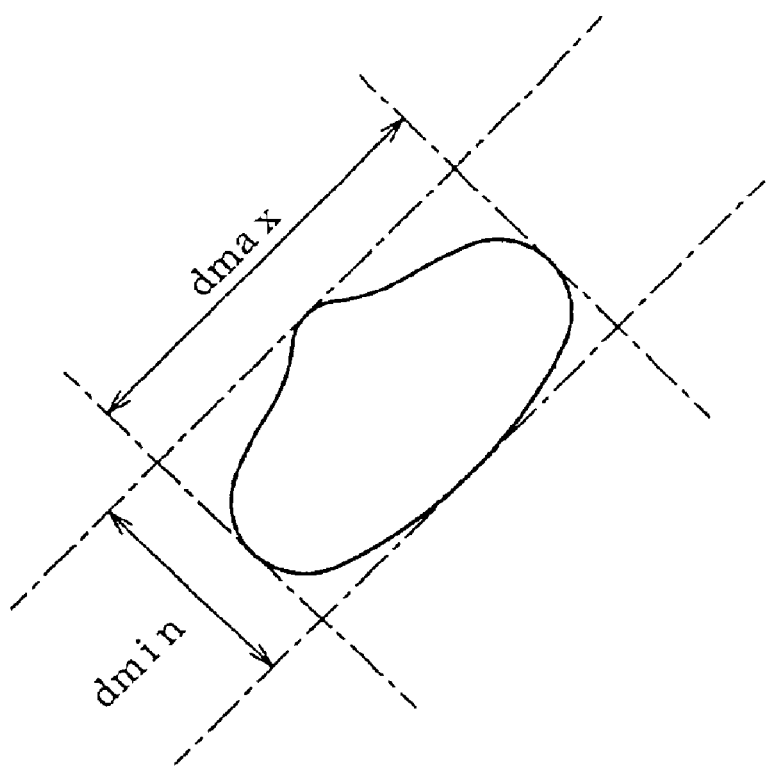
FIG. 5 is an explanatory view showing the definition of grain size.

The main face $1c$ of the ceramic base member 4 was mirror-polished, and observed under a scanning electron microscope (SEM). Through image analysis, the sizes of hard-phase crystal grains identified on the observed image (observed as black areas in the white alumina matrix ceramic phase) were measured in accordance with the definition shown in FIG. 5; and their average value (average grain size) and an area ratio (corresponding to the content by volume of hard-phase crystal grains) was obtained. Hv is Vickers hardness. The strength was determined by the three-point bending test specified in JIS R1601 (1981). Table 2 shows the measurement results.

TABLE 2

| | Area ratio of hard phase (%) | Average grain size (μm) | Theoretical density ratio (%) | Hv (Gpa) | Strength (MPa) |
|---|---|---|---|---|---|
| 1 | 0 | 1.0 | 99.9 | 17.5 | 700 |
| 2 | 4 | 0.8 | 99.8 | 18.8 | 840 |
| 3 | 8 | 0.7 | 99.9 | 19.6 | 870 |
| 4 | 17 | 0.6 | 99.8 | 19.9 | 920 |
| 5 | 26 | 0.5 | 99.9 | 20.8 | 1000 |

TABLE 2-continued

| | Area ratio of hard phase (%) | Average grain size (μm) | Theoretical density ratio (%) | Hv (Gpa) | Strength (MPa) |
|---|---|---|---|---|---|
| 6 | 35 | 0.5 | 99.9 | 21.5 | 950 |
| 7 | 40 | 0.6 | 99.7 | 22.1 | 900 |
| 8 | 25 | 0.9 | 99.7 | 19.8 | 1050 |
| 9 | 26 | 0.7 | 99.8 | 20.4 | 980 |
| 10 | 22 | 0.7 | 99.9 | 21.5 | 1000 |
| 11 | 22 | 0.9 | 99.8 | 20.5 | 970 |
| 12 | 21 | 1.0 | 99.8 | 20.0 | 1000 |
| 13 | 25 | 0.9 | 99.9 | 20.5 | 970 |
| 14 | 26 | 1.1 | 99.9 | 19.1 | 850 |
| 15 | 21 | 1.2 | 99.9 | 19.2 | 870 |

The thus-obtained ceramic base member 4 was placed in a reaction chamber of a known CVD apparatus, and a coating layer was formed under one of the following sets of conditions to thereby obtain a tip sample. Notably, the thickness of the formed layer is changed by adjusting the reaction time. As indicated below, "MT" means "moderate temperature". Therefore, "MT-TiCN", for example, means TiCN formed at a moderate temperature.

(1) MT-TiCN Layer (Example of the Invention)
   Layer formation temperature: 870° C.;
   Reaction pressure: 80 hPa (hecto-Pascal);
   Carrier gas type (flow rate): $H_2$ (18 liter/min);
   Source gas type (flow rate): $N_2$ (10 liter/min), $TiCl_4$ (1.8 ml/min), and $CH_3CN$ (0.3 ml/min).

(2) MT-TiN Layer (Example of the Invention)
   Layer formation temperature: 900° C.;
   Reaction pressure: 800 hPa;
   Carrier gas type (flow rate): $H_2$ (13.5 liter/min);
   Source gas type (flow rate): $N_2$ (5.6 liter/min), and $TiCl_4$ (0.8 ml/min).

(3) TiN Layer (Comparative Example)
   Layer formation temperature: 980° C.;
   Reaction pressure: 800 hPa;
   Carrier gas type (flow rate): $H_2$ (13 liter/min);
   Source gas type (flow rate): $N_2$ (10 liter/min), and $TiCl_4$ (1.1 ml/min).

When the structure of the coating layer thus formed was evaluated by means of X-ray diffraction, each of the coating layers (2) and (3) was found to contain titanium nitride (TiN) as a predominant component, and the coating layer (1) contained titanium carbonitride (TiCN) as a predominant component. Further, when the composition of the coating layer (1) was evaluated by means of x-ray photoelectron spectroscopy, the composition was found to be $TiC_{0.3}N_{0.7}$. Moreover, the surface of the coating layer of each sample was observed under an SEM in order to measure the size of constituent crystal grains of the coating layer in the same manner as that for the above-described hard phase to thereby obtain its average value. Further, after performing a cutting test, described below, each sample was cut along a plane perpendicularly intersecting the main face, and the average thickness of the coating layer was measured from the cross sectional image. Table 3 shows the measurement results. In Table 3, "MT-TiCN" refers to coating layer (1) of the invention, "MT-TiN" refers to coating layer (2) of the invention, and "TiN" refers to comparative coating layer (3). "MT-TiCN/MT-TiN" in Nos. 23 and 25 refers to a double coating layer of (1) and (2), where (2) is coated after (1).

TABLE 3

| | Ceramic base member No. (Tables 1 and 2) | Material of coating layer | Average film thickness (μm) | Cutting distance (m) | Average grain size of coating layer (μm) |
|---|---|---|---|---|---|
| 1* | 1 | MT-TiN | 1.0 | Initial fracture | 0.2 |
| 2 | 2 | MT-TiN | 1.0 | 840 | 0.2 |
| 3 | 3 | MT-TiN | 1.0 | 930 | 0.2 |
| 4 | 4 | MT-TiN | 1.0 | 980 | 0.2 |
| 5 | 5 | MT-TiN | 1.0 | 1060 | 0.2 |
| 6 | 6 | MT-TiN | 1.0 | 1130 | 0.2 |
| 7 | 7 | MT-TiN | 1.0 | 1010 | 0.2 |
| 8 | 8 | MT-TiN | 1.0 | 970 | 0.2 |
| 9 | 9 | MT-TiN | 1.0 | 1060 | 0.2 |
| 10 | 10 | MT-TiN | 1.0 | 1200 | 0.2 |
| 11 | 11 | MT-TiN | 1.0 | 1170 | 0.2 |
| 12 | 12 | MT-TiN | 1.0 | 1040 | 0.2 |
| 13 | 13 | MT-TiN | 1.0 | 1080 | 0.2 |
| 14 | 14 | MT-TiN | 1.0 | 790 | 0.2 |
| 15 | 15 | MT-TiN | 1.0 | 810 | 0.2 |
| 16* | 5 | — | — | 500 | — |
| 17* | 5 | MT-TiN | 0.2 | 580 | 0.1 |
| 18 | 5 | MT-TiN | 0.5 | 800 | 0.1 |
| 19 | 5 | MT-TiN | 1.8 | 1130 | 0.5 |
| 20* | 5 | MT-TiN | 3.0 | 700 | 1.0 |
| 21* | 5 | TiN | 1.0 | 650 | 1.0 |
| 22 | 9 | MT-TiCN | 1.5 | 1100 | 0.5 |
| 23 | 9 | MT-TiCN/ MT-TiN | 1.5 | 1080 | 0.4 |
| 24* | 9 | MT-TiCN | 3.0 | 650 | 0.9 |
| 25* | 9 | MT-TiCN/ MT-TiN | 2.5 | 600 | 0.8 |

*Comparative Example

Figure 6:
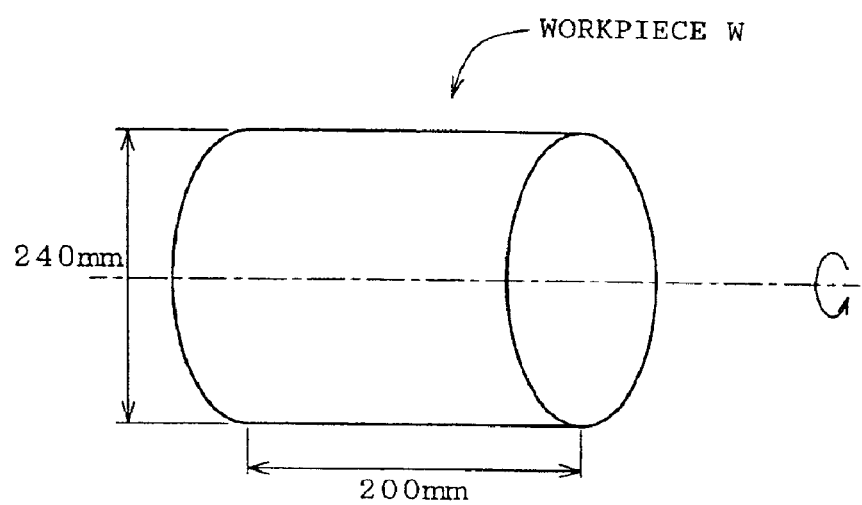
FIGS. 6($a$) and 6($b$) are an explanatory view showing the shape of a workpiece used in the cutting test (FIG. 6($a$)), and the positional relationship between the workpiece and a tool during cutting (FIG. 6($b$))
Figure 6:
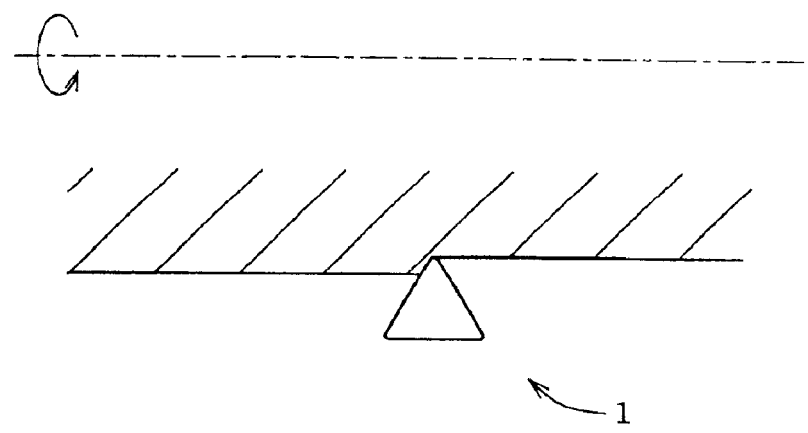

Next, the cutting performance of each sample (tool) was evaluated under the conditions described below. That is, a bar-shaped workpiece W having the shape shown in FIG. 6(a) was rotated about its axis; and a tip sample was brought into contact with the outer circumferential surface of the workpiece W as shown in FIG. 6(b) to thereby continuously cut the outer circumferential surface of the workpiece W in a dry state. One main face 1c was used as a cutting face and a side face 1e was used as a flank:

Material of workpiece: carburized and quenched steel (SCM 415; Vickers hardness Hv =70 to 85 GPa);
   Shape: round bar (outer diameter: 240 mm, length: 200 mm);
   Cutting speed V: 200 m/min;
   Feed rate: 0.1 mm/revolution;
   Depth of cut: 0.2 mm;
   Cutting oil: not used (dry cutting);
   Treatment of cutting edge: chamfer (0.2 mm, 25°)+curved surface (radius: 0.02 mm) (type shown in FIG. 1(e)).
   Evaluation method: a cutting distance before the cutting edge fractured was measured as an index of fracture resistance.

Figure 7:
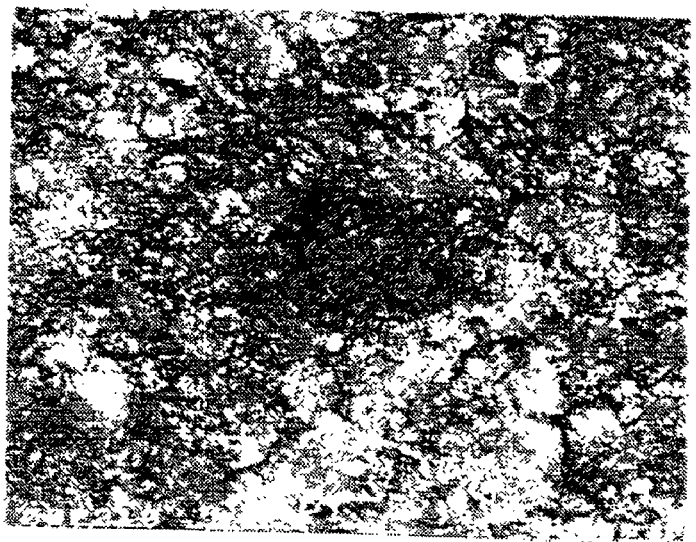
FIGS. 7($a$) and 7($b$) are SEM observation images of the surface (FIG. 7($a$)) and cut surface (FIG. 7($b$)) of the coating layer formed on sample No. 5 used in the experiment performed in the Example.
Figure 7:
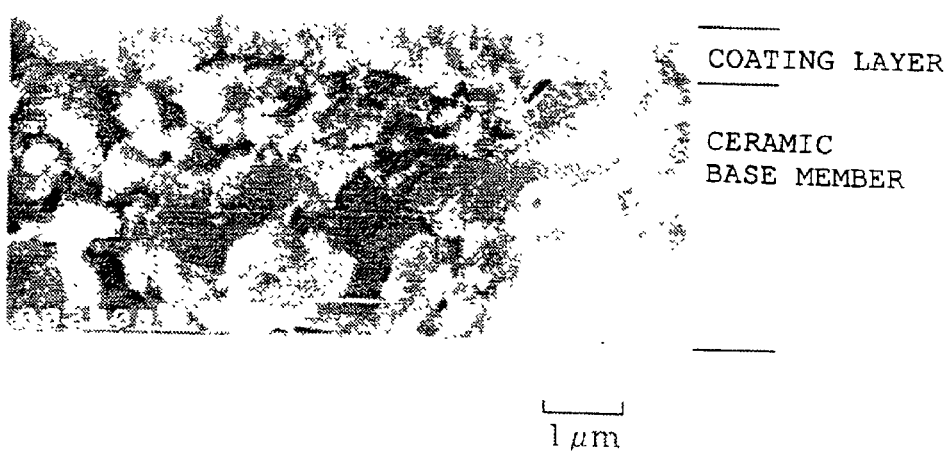
Figure 8:
FIGS. 8($a$) and 8($b$) are SEM observation images of the surface (FIG. 8($a$)) and cut surface (FIG. 8($b$)) of the coating layer formed on sample No. 21 used in the experiment performed in the Example.
Figure 8:
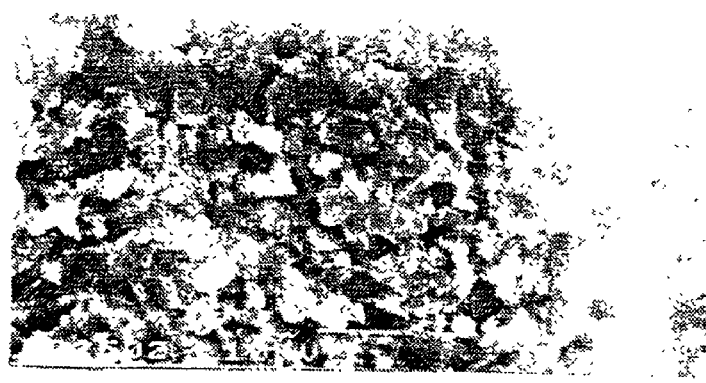

Table 3 also shows the measured cutting distance. From Table 3, it is understood that samples whose coating layers have an average crystal-grain size and an average thickness falling within the prescribed numerical ranges exhibit excellent fracture resistance. FIG. 7 shows SEM observation images of the surface (FIG. 7(a)) and cut surface (FIG. 7(b)) of the coating layer formed on sample (Example) No. 5 shown in Table 3. FIG. 8 shows SEM observation images of the surface (FIG. 8(a)) and cut surface (FIG. 8(b)) of the coating layer formed on sample (Example) No. 21 shown in Table 3.

It should be further apparent to those skilled in the art that various changes in form and detail of the invention as shown and described above may be made. It is intended that such changes be included within the spirit and scope of the claims appended hereto.

This application is based on Japanese Patent Application No. 2000-272071 filed Sep. 7, 2000, the disclosure of which is incorporated herein by reference in its entirety.

What is claimed is:

1. A cutting tool having a tool main body, wherein the tool main body comprises: a ceramic interior portion formed of a composite ceramic which contains a hard phase dispersed within a matrix ceramic phase, said matrix ceramic phase containing alumina as a predominant component, wherein the hard phase contains at least one hard-phase-forming metal element in the form of at least one of carbide, nitride, or boride, or in the form of a solid solution of at least two selected from the carbide, nitride and boride; and a single coating layer covering the surface of the ceramic interior portion consisting of titanium nitride, wherein the coating layer has an average crystal-grain size in the range of from 0.1 to 0.5 $\mu$m as observed on the surface, and an average thickness in the range of from 0.5 to 2 $\mu$m.

2. The cutting tool as claimed in claim 1, wherein the hard-phase-forming metal element is selected from the group consisting of Ti, Zr, Hf, V, Nb, Ta, Cr, Mo, W and Si.

3. The cutting tool as claimed in claim 1, wherein the single coating layer is formed by CVD at a temperature in the range of from 750 to 900° C.

4. The cutting tool as claimed in claim 1, wherein the hard phase comprises from 5 to 40% by volume of the composition of the composite ceramic constituting the ceramic interior portion.

5. The cutting tool as claimed in claim 1, wherein crystal grains in the hard phase of the composite ceramic constituting the ceramic interior have an average grain size in the range of from 0.3 to 1 $\mu$m.

6. The cutting tool as claimed in claim 1, wherein the single coating layer has an average thickness in the range of from 0.5 to 1 $\mu$m.

7. A cutting tool having a tool main body, wherein the tool main body comprises: a ceramic interior portion formed of a composite ceramic which contains a hard phase dispersed within a matrix ceramic phase, said matrix ceramic phase containing alumina as a predominant component, wherein the hard phase contains at least one hard-phase-forming metal element in the form of at least one of carbide, nitride, or boride, or in the form of a solid solution of at least two selected from the carbide, nitride and boride; and a single coating layer covering the surface of the ceramic interior portion and consisting of titanium nitride, wherein the coating layer has an average crystal-grain size in the range of from 0.1 to 0.5 $\mu$m as observed on the surface, and an average thickness in the range of from 0.5 to 2 $\mu$m, wherein the tool main body constitutes a throw-away tip.

8. The cutting tool as claimed in claim 7, comprising said throw-away tip and a tip holder to which the throw-away tip is removably attached.

9. The cutting tool as claimed in claim 1, wherein the single coating layer is formed by chemical vapor deposition at a temperature within the range of 750 to 900° C.

* * * * *